March 10, 1970 H. C. A. VAN DUUREN ET AL 3,500,319

APPARATUS TO PREVENT LOSS OF INFORMATION IN AUTOMATIC CHANNEL SWITCHING DEVICE

Filed Dec. 6, 1967

6 Sheets-Sheet 1

INVENTORS
H. C. A. VAN DUUREN
H. DA SILVA
W. F. BROK

BY Hugh A. Kirk

ATTORNEY

INVENTORS
H. C. A. VAN DUUREN
H. DA SILVA
W. F. BROK
BY Hugh A. Kirk
ATTORNEY

INVENTORS
H. C. A. VAN DUUREN
H. DA SILVA
W. F. BROK
BY Hugh A. Kirk
ATTORNEY

INVENTORS
H. C. A. VAN DUUREN
H. DA SILVA
W. F. BROK
BY [signature]
ATTORNEY

INVENTORS
H. C. A. VAN DUUREN
H. DA SILVA
W. F. BROK
BY Hugh A. Kirk
ATTORNEY

INVENTORS
H. C. A. VAN DUUREN
H. DA SILVA
W. F. BROK
BY [signature]
ATTORNEY

United States Patent Office 3,500,319

Patented Mar. 10, 1970

3,500,319

APPARATUS TO PREVENT LOSS OF INFORMATION IN AUTOMATIC CHANNEL SWITCHING DEVICE

Hendrik Cornelis Anthony van Duuren, Wassenaar, and Herman da Silva and Wilhelm Fredrik Brok, Voorburg, Netherlands, assignors to De Staat der Nederlanden, Ten Deze Vertegenwoordigd Door de Directeur-General der Posterijen, Telegrafie en Telefonie, The Hague, Netherlands Filed Dec. 6, 1967, Ser. No. 688,555

Int. Cl. G08b *29/00;* H04l *5/00*

U.S. Cl. 340—146.1 4 Claims

ABSTRACT OF THE DISCLOSURE

An improvement in a multi-channel switching device for a multi-channel automatic error correcting system cycle synchronized telecommunication system, for preventing the loss of signals when an abrupt and prolonged disconnection of a channel occurs, comprising a second or dummy storage device for the signals at the transmitting station together with two register counters, one for recording the phase of the start of the repetition cycle of the automatic correcting system with respect to the system cycle synchronization and the other for counting of a whole repetition or system cycle after reconnection of the channel has been established; and at the receiving station another two register counters, one for recording the phase of the repetition cycle with respect to the system cycle and the other for blocking the printer until the proper reconnection and synchronization has been established.

RELATED APPLICATION

An improvement in U.S. patent application Ser. No. 489,318 filed Sept. 22, 1965.

BACKGROUND OF THE INVENTION

In prior automatic error correcting or TOR multi-channel telecommunication systems over wire or radio links, there were required separate adaptors, such as a TEX-panel for each TOR or ARQ (automatic error correction) channel, with each TEX-panel being the connecting link for controlling the associated ARQ-channel from the telegraph or telex exchange. According to applicants' copending application Ser. No. 489,318 filed Sept. 22, 1965 more flexibility is obtained by providing a FLEX-system for automatic switching each TEX-panel to any one of the TOR-channels which is unoccupied and has not lost its efficiency or quality, which switching can be automatic when a connected TOR-channel has lost its efficiency or quality. However, in this flexibility and automatic switching between TOR-channels, there is the possibility of losing a maximum of three information characters according to said copending application. This occurs when the loss of efficiency is so slow, or abrupt and continuous that the three idle time $\beta$ signals cannot be transmitted to effect a normal disconnection and switching to a new channel, and because after a predetermined time, of say about thirty seconds for such an interruption, the channel then automatically disconnects without any further transmission or reception.

SUMMARY OF THE INVENTION

This invention deals with a system for preventing the loss of signals in such a flexible multi-channel telecommunication system having automatic error correction as disclosed in applicants' above mentioned copending application, when one of the channels is disconnected or abruptly interrupted for a relatively long time by conditions in the propagation or in the terminal equipment.

The particular flexible multi-channel telecommunication system of this invention includes transmission of multi-element code signals in system cycle synchronism, such as disclosed in Van Duuren et al. U.S. Patent No. 3,156,767 and/or U.S. Patent No. 3,230,309, which system cycle contains a group of a predetermined number of signals which correspond to the number of signals in the repetition cycle employed in the automatic correction device. The system cycles may be determined by alternate patterns of inversion so that proper synchronism between the repetition cycle and the system cycle can be obtained to insure that no loss of signals will occur when one of the transmission channels is cut off or its efficiency is so low that a cut-off or closing signal cannot be transmitted thereover.

The switching device of the improved flexible multi-channel or FLEX system of this invention generally comprises: a transmitting programming circuit connected to each of said transmitting parts of each subscriber adaptor circuit or TEX-panel, a first selecting switch means controlled by the transmitting programming circuit which is connected to each of the transmitting parts of all the radio or ARQ channels in one station, automatic request for repetition systems including a first storage means for a predetermined number of signals, a dummy or second standby storage device for the same predetermined number of signals, a plural bit counting phase register for indicating the position in the system cycle at the start of the repetition cycle, and plural bit register counter for counting out a whole cycle after a proper reconnection has been made. This FLEX-system also comprises a receiving programming circuit connected to each of the receiving parts of each ARQ channel at this station, a second selecting switch means controlled by the receiving programming circuit which is connected to each of the receiving parts of the subscriber adaptor or TEX-panel circuits at this station, a separate testing means connected between the receiving part of said first selecting switch of the transmitting programming circuit for indicating to the transmitting programming circuit which ones of the ARQ-channels have been disconnected (either because of low efficiency or quality, or interruption), a second plural bit phase register for indicating the position of receiving system cycle at the moment of the disconnection which is the initiation of a repetition cycle, and an off-on or 1-bit register means for blocking the printing of any received signal when a disconnect or a repetition cycle starts, thereby insuring proper synchronism or coincidence between the system cycle and the start of the repetition cycle when a new channel has been selected after the disconnect of the previous channel over which the signals were transmitted. This improved system also includes means for first transmitting the address of the TEX-panel which is to be connected over the new selected ARQ-channel, which address is started in the position of the register system cycle, and then the address is followed immediately by the signals which were in the dummy or second storage means, so that no signals will be lost by the abrupt cut-off of any TOR-channel.

Accordingly, it is an object of this invention to overcome the difficulty mentioned in the above identified copending application, and to prevent loss of information in the event a channel in such a multi-channel switching system is abruptly disconnected and/or cannot communicate anything for a predetermined period of time, say thirty seconds.

Another object is to provide such a multi-channel switching system in which no loss of signals occurs due to such a disconnection by providing additional and adequate storing means for the signals, and a system cycle synchronism for the transmitted signals, so that the proper coincidence on reconnection will occur.

BRIEF DESCRIPTION OF THE VIEWS

The above mentioned and other features, objects and advantages and the manner of attaining them are described more specifically below by reference to an embodiment of this invention shown in the accompanying drawings, wherein.

Figure 5:
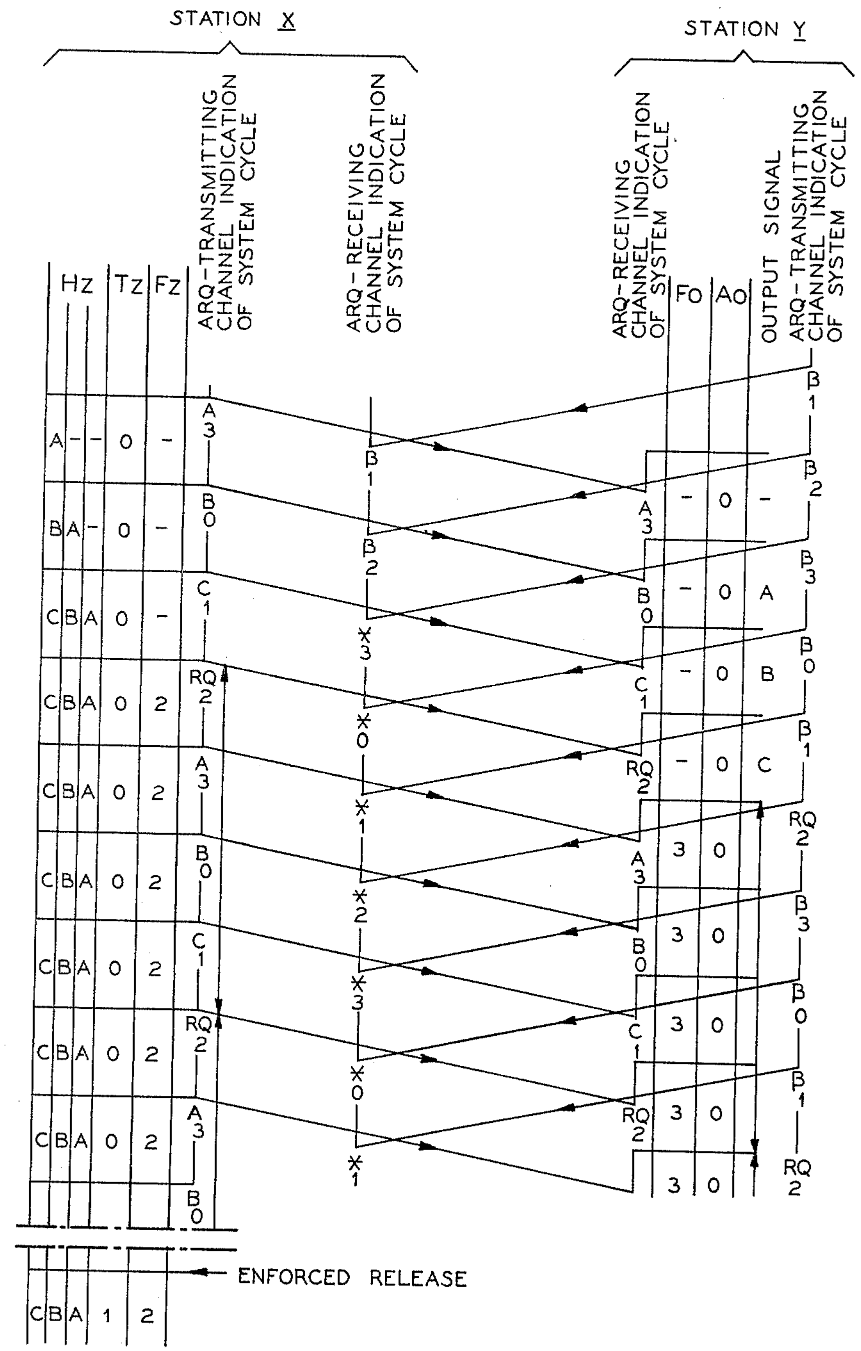
FIG. 5 is a schematic time diagram showing the sequence for disconnect operation from a channel which has become unuseable due to continuous mutilation at the receiver of an information sending station according to this invention.
Figure 6:
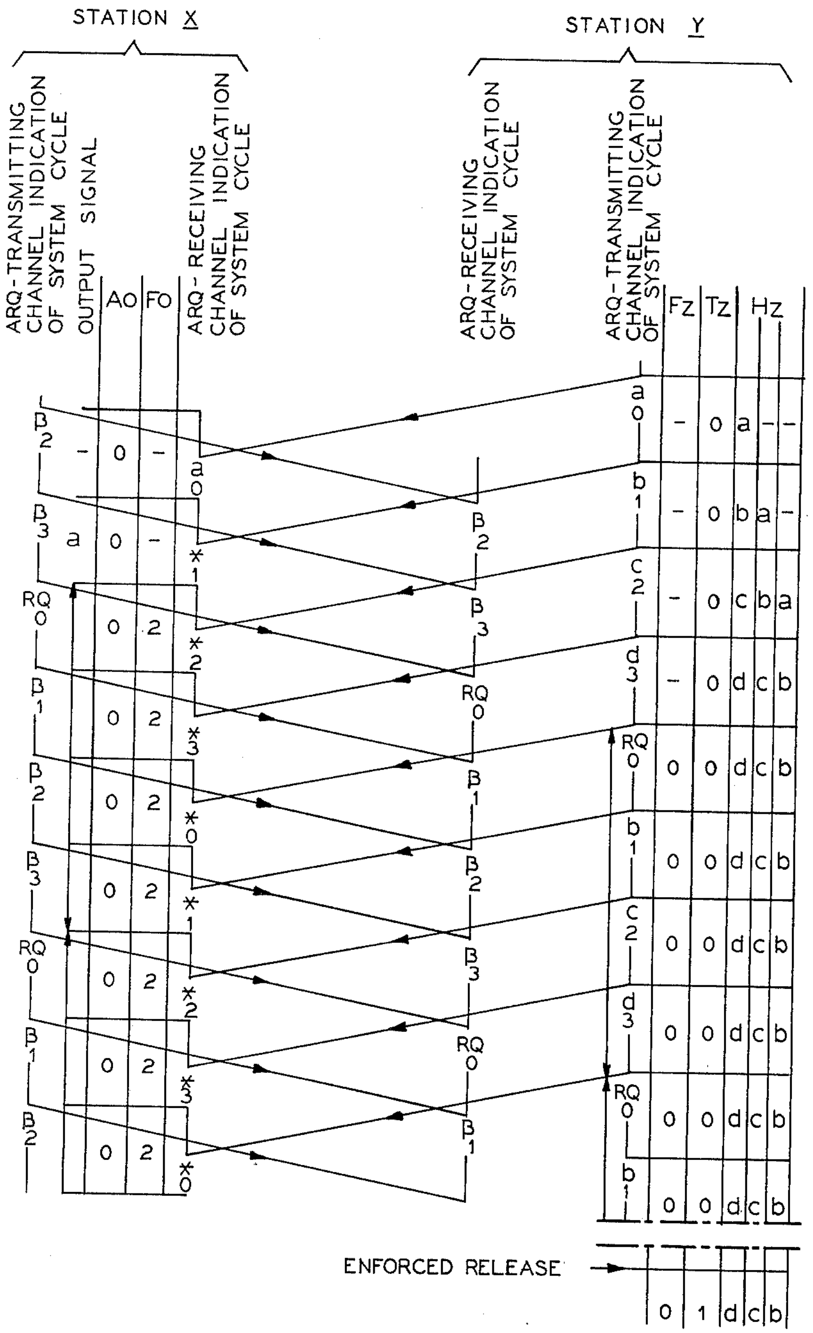
Figure 7:
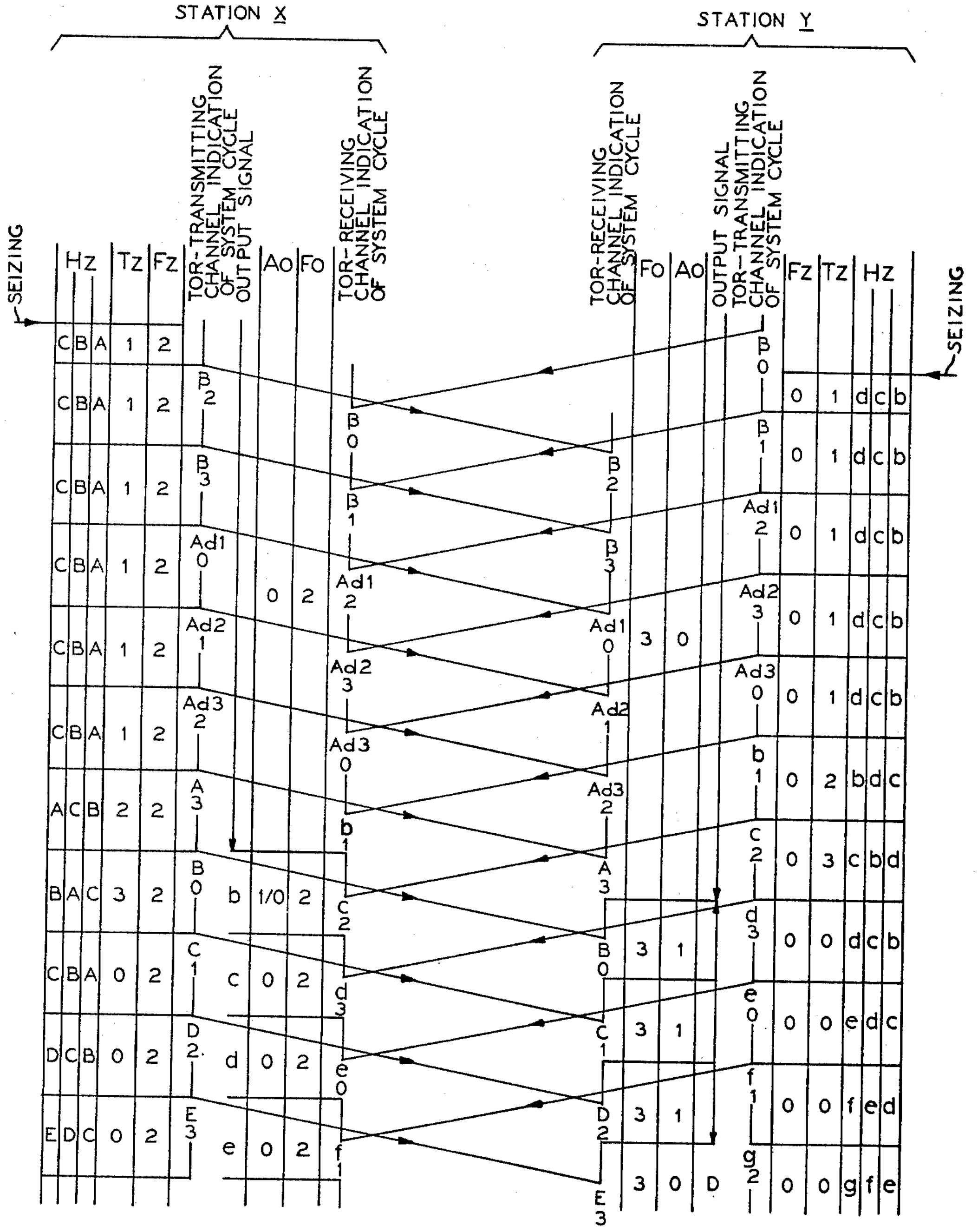

FIG. 6 is a schematic time diagram of the sequence for disconnect operation from a channel which has become unuseable due to the continuous mutilation at the receiver of an information receiving station according to this invention; and FIG. 7 is a schematic time diagram of a continuation of the diagrams of FIGS. 5 and 6 showing the process for seizing a new channel, and the position of the counting circuits and signals transmitted and received during such a seizing operation.

DETAILED DESCRIPTION OF A PREFERRED EMBODIMENT

The detailed description of this improved FLEX-system switching device and its function will be described in accordance with the following outline:

(A) A MULTI-CHANNEL SWITCH SYSTEM (FIGS. 1, 2 and 3)
- (1) The Apparatus
- (2) The Operation (B) IMPROVEMENT TO PREVENT LOSS OF SIGNALS (FIGS. 3–7)
- (1) Apparatus (FIGS. 3 and 4)
  - (a) At sending part
  - (b) At receiving part
- (2) Operation (FIGS. 5, 6 and 7)
  - (a) Enforced releases (FIGS. 5 and 6)
  - (b) Reconnections (FIG. 7)

Figure 1:
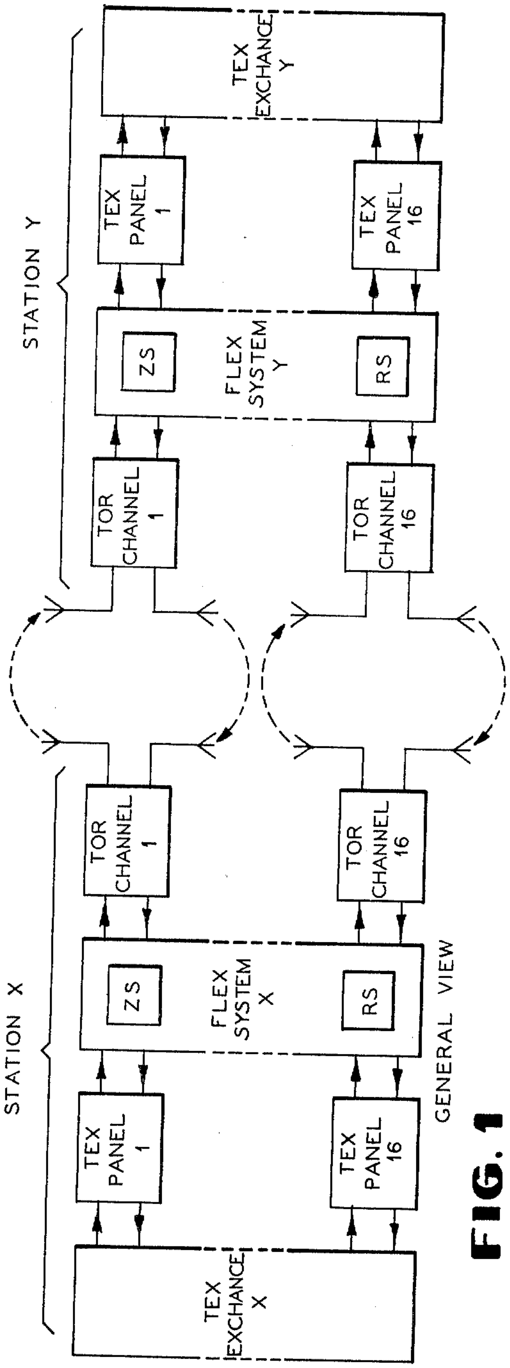
FIG. 1 is a general schematic block diagram showing where the switching device of the improved FLEX system of this invention is placed in a radio type telegraph system of the automatic error correction type, namely between the TEX-panels and the ARQ-channels at each station.
Figure 2:
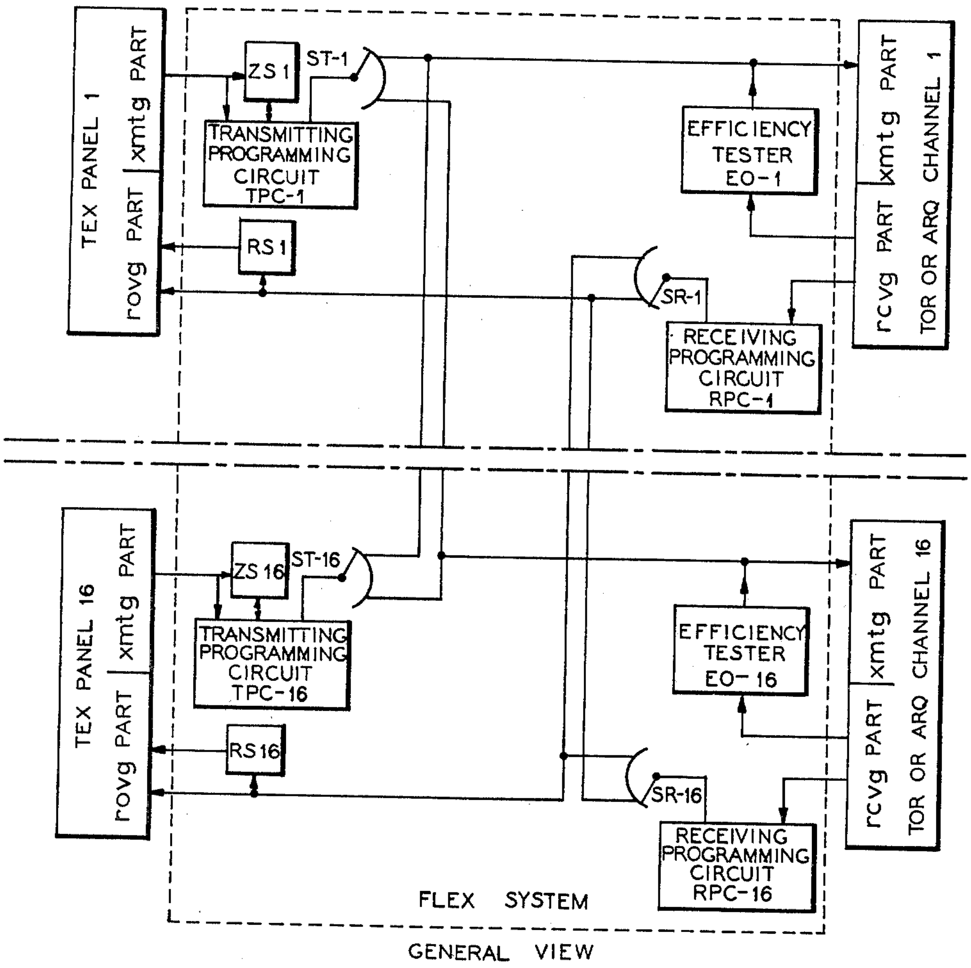
FIG. 2 is a basic schematic block diagram of part of one of the FLEX-system switching devices of FIG. 1 showing only the programming circuits, selecting switch means, the tester circuits, and the circuits to prevent loss of signals for the first and last of a sixteen TEX-panel and a sixteen ARQ- or TOR-channel station.
Figure 3:
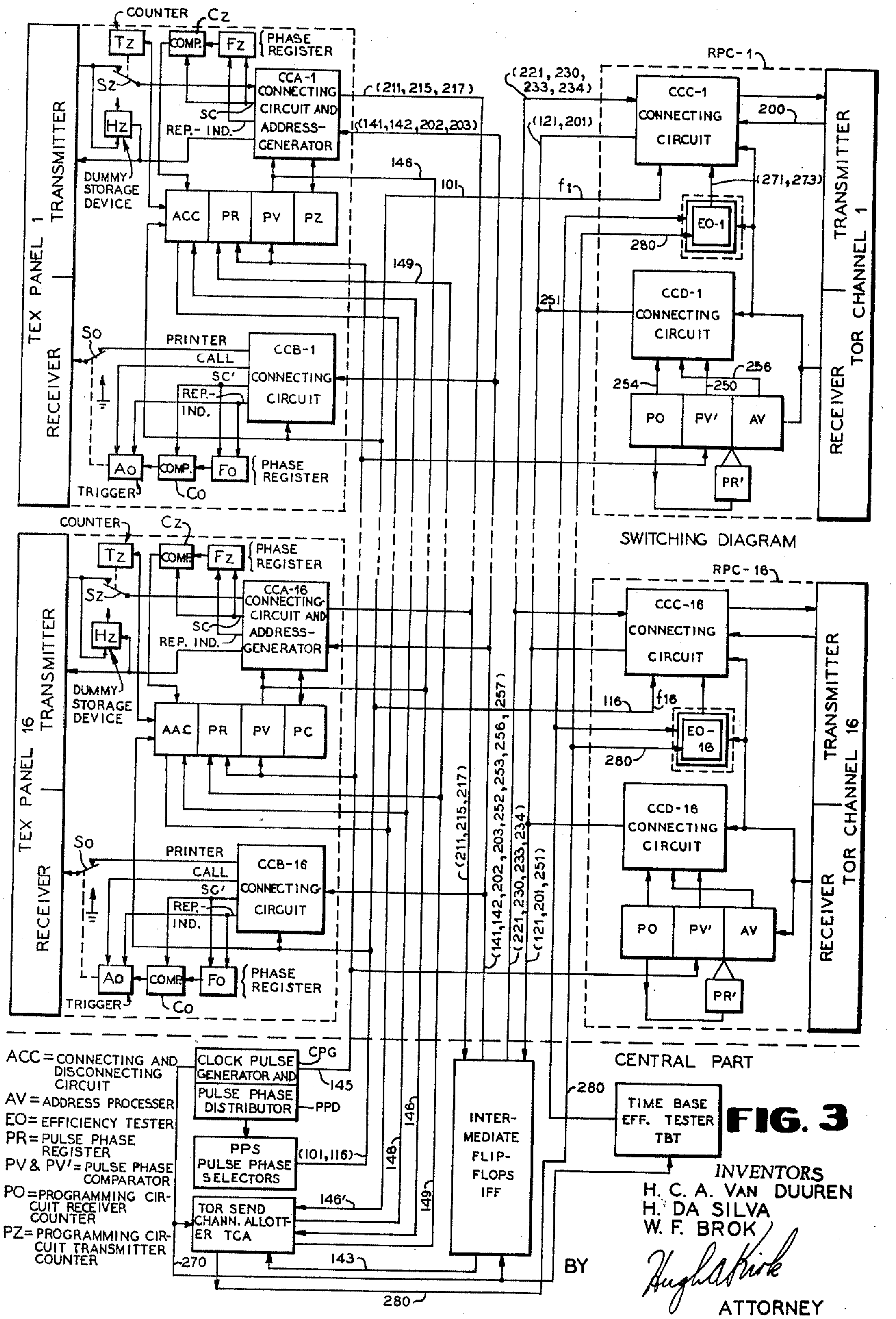
FIG. 3 is a more specific schematic block wiring diagram of one embodiment of a FLEX-system switching device similar to that shown in FIG. 2, but employing phase or time-division selective switching and showing the essential parts of the improvement of this invention.

(A) MULTI-CHANNEL SWITCHING SYSTEMS (FIGS. 1, 2 and 3)

(1) The Apparatus

Referring first to FIG. 1 there is shown schematically in blocks the general circuits of a telegraph or telex radio telecommunication link between two spaced stations X and Y with the radio antennas for the to and from paths being connected by dotted arrows in the center of the drawing, for the first and last channel of a sixteen TOR-channel system. At each station the telegraph or telex subscribers are connected to a TEX-exchange which TEX-exchange connects with each of the sixteen TEX-panels to the FLEX-system switching device of this invention, which enables any one of the TEX-panels to select any one of the TOR-channels which may be available and efficient for communication to the other station. Correspondingly, according to the address automatically transmitted from the TEX-panel which is doing the calling, the corresponding TEX-panel at the remote station is automatically selected according to this system. The improved circuits of this invention which are described hereafter, are those contained in the blocks labelled XS and RS inside the FLEX-system X or FLEX-system Y shown in this FIG. 1.

Referring now to FIG. 2, there is shown schematically in the dotted rectangle of the major central part of this figure, general circuits of the FLEX-system switching device which occurs at each station. Connected to this dotted rectangle are parts of four blocks representing the first and sixteenth TEX-panel and first and sixteenth TOR or ARQ-channel. Each TEX-panel and each TOR or ARQ-channel block is divided into an upper transmitting part and a lower receiving part.

Referring first to the TEX-panel transmitting part from which a calling subscriber or a call originates, the initiation of the call is first transmitted to a transmitting programming circuit TPC–1 which is turn controls the transmitting selecting switch ST–1 controlled by this transmitting programming circuit TPC–1 to connect over a multiconductor contact any one of the sixteen ARQ or TOR-channels, as well as being multiplied with the corresponding contacts on each of the other transmitting selecting switches ST–2 through ST–16.

On the other TOR or ARQ-channel side of the FLEX-system switching device, the receiving part of each TOR-channel is connected to a receiving programming circuit RPC–1 through RPC–16 corresponding to each of the sixteen TOR-channels, each of which receiving programming circuits RPC–1 through RPC–16 is connected to and controls a corresponding receiving selector switch SR–1 through SR–16 to connect over a multiconductor contact any one of the sixteen TEX-panels, as well as being multiplied with the corresponding contacts on each of the other receiving selector switches RPC–1 through RPC–16.

In addition to these general selector switches ST and SR and their programming circuits TPC and RPC, there is also provided for each TOR-channel an efficiency tester circuit EO–1 through EO–16, connected between the receiving part of each TOR-channel and one of the multiconductor wires to each of the transmitting selector switches ST–1 through ST–16, so as to indicate to each of the transmitting programming circuits TPC–1 through TPC–16 which ones of the ARQ circuits are efficient and which ones are not efficient.

Furthermore, there is shown connected to the transmitting part of each TEX-panel, a transmitting auxiliary storing, registering, and counting circuit ZS–1 through ZS–16 which is also connected to the corresponding transmitting programming circuits TPC–1 through TPC–16 for storing the last three character or message signals transmitted and for determining the phase relationship between the system cycle and the repetition cycle when an error caused by an abrupt and continuing interruption in the connected TOR-channel occurs. Similarly, connected to the receiving part of each TEX-panel, there is a phase register and repetition indicating trigger circuit RS–1 through RS–16 for reconnecting a new TOR-channel's system cycle in phase with the prior channel which had been disconnected to insure that no message or character signals are lost.

Referring now to FIG. 3, there is more specifically shown an embodiment which may be employed at separate communicating stations X and Y of a pulse phase or tie division electronic selecting switching system; each station having sixteen TEX-panels and sixteen TOR-channels connected according to the FLEX switching system of applicants' copending application Ser. No. 489,318 filed Sept. 22, 1965. The common selection switching means and circuits for all of these panels and channels at each station are shown in the lower part of this figure, below the horizontal dotted line and indicated as the "Central Part." In FIG. 3 two of the sixteen, namely the first and last, of the TEX-panels and TOR-channels, are also shown with their respective connections, however.

The dotted rectangles joined to each of the TEX-panel and TOR-channel blocks, refer to the corresponding transmitting and receiving programming circuits TPC and RPC, as shown in FIG. 2, however, those of the receiving programming circuits RPC have dotted rectangular holes in them for the separate efficiency tester circuits EO, which in FIG. 2 are separately indicated.

The time or phase division selection switching means include the connecting circuits CCA, CCB, CCC, and CCD. The connecting circuits CCA–1 through 16 (which include the address shapers) connect each of the transmitting parts of the adaptor or TEX-panels to each of the transmitting parts of the TOR-channels through connecting circuits CCC–1 through 16 through intermediate flip-flop circuits IFF in the common or Central Part. This intermediate flip-flop circuit IFF or switching center circuit also may be controlled by the pulse phasing generated in the Central Part.

Controlling each connecting and address shaper circuit CCA is a connnecting and disconnecting circuit AAC, a transmitter pulse phase register circuit PR, a transmitter pulse phase comparator circuit PV, and a transmitter program counter circuit PZ, all of which circuits are controlled via conductors from the Central Part as well as by each other and by the other transmitter programming circuits TPC of the system through the transmitting TOR-channel allotter circuit TCA in the Central Part.

In addition, each of the transmitting programming circuits TPC is provided with another connecting circuit CCB–1 through CCB–16, which is connected to the receiving part of each of the TEX-panels and is controlled by the common or Central Part both from the pulse phase selectors PPS, as well as the intermediate flip-flop circuits IFF through which they are connected to each of the connecting circuits CCD–1 through CCD–16 connected to the receiving parts of corresponding TOR-channels.

Figure 4:
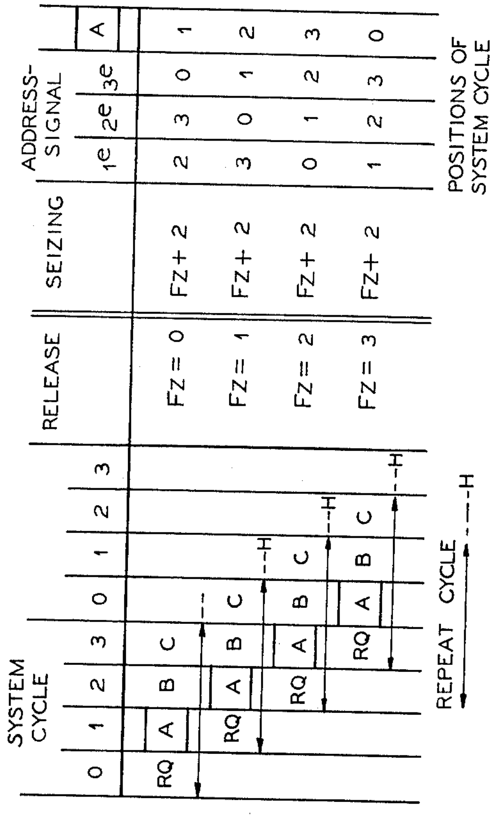
FIG. 4 is a table of all the possible release and seizing cycle positions for signals according to a four revolution system cycle and repetition cycle telecommunication system according to this invention.

Referring to the receiving programming circuits RPC connected to each of the TOR-channels 1 through 16 in FIG. 4, there is shown not only the connecting circuit CCC–1 through 16 as previously mentioned, but also the just mentioned connecting circuits CCD–1 through 16 which are controlled by an address processing circuit AV, a receiver pulse phase register circuit PR′, a receiver pulse phase comparator circuit PV′, and a receiver program counter circuit PO, each of which circuits control each other in sequence, and also the operation of their associated connecting circuits CCD.

As also previously mentioned, the receiving part of each of the TOR-channels is connected to a corresponding efficiency tester circuit EO–1 through 16, which is connected through its associated connecting circuit CCC and the common intermediate flip-flop circuit IFF to each of the transmitter connecting circuits CCA. These efficiency tester circuits EO also are controlled by the time base efficiency tester circuit PBT in the Central Part.

The common or Central Part includes means for generating the time divisions or pulse phase divisions for controlling the selection switching and may comprise a clock pulse generator and pulse phase distributor circuits CPG and PPD, respectively, which in turn control a pulse phase selector circuit PPS which divides each cycle of the distributor PPD into corresponding different time divisions, corresponding in this case to sixteen separate time-spaced pulses or phases, one for each of the adaptor or TEX-panels and/or each of the TOR-channels. The pulse phase distributor PPD also generates the binary code number of each one of these consecutive sixteen divisions which correspond both to the number of each TOR-channel and each TEX-panel as well as to the address for each panel for direct selection of each panel and TOR-channel. Also in the Central Part is provided a transmitter channel allotter circuit TAC which detects which one of the TEX-panels is ready to transmit a message, and which TOR-channels are efficient and which one are occupied, and also controls the interruption of a message for transmitting release signals to and through the remote station in the event no other available and efficient TOR-channel exists in the system. Accordingly, this particular allotter circuit TCA is connected with each of the TEX-panels, and controls the operations of the connecting and disconnecting circuits AAC, and the transmitter pulse phase register circuits PR. The transmitter and receiver pulse phase register circuits PR and PR′ as as well as the transmitter pulse phase comparator circuit PV are connected to the clock pulse generator and phase distributor circuits CPG and PPD. The time base tester TBT may also be connected to the clock pulse generator and pulse distributor circuits CPG and PPD for its control, as is the transmitter channel allotter TCA.

(A)(2) Operation

According to the present FLEX-system invention, however, it is necessary to send an address because of the selection between the different TEX-panels and TOR-channels, which address for the corresponding TEX-panel at the remote station must be inserted every time a remote TEX-panel is to be connected. In this time-division selection system, each of the transmitting paths through the selector switching devices are continually rotating or cycling on a base of time division, so that the transmitting path of each ARQ or TOR-channel disposes of one "free position" on the selector, which "free position" is taken during the "free line condition" and the "temporary idle condition" of the TEX-panel circuit. In these cases the transmitting part of the TEX-panel is not connected to any of the TOR-channels, so that each TOR-channel that is not connected to a TEX-panel automatically transmits the idle time $\beta$ signals.

The TEX-panel immediately abandons this "free position" condition of the selector in case one of the following conditions occurs at the outlet terminals of the TEX-panel:

(a) A call criterion,
(b) Traffic, or
(c) A clearing criterion.

As soon as the programming circuit TPC, which is found at each TEX-panel terminal of the Flex system, detects one of the three above mentioned case (a), (b), or (c) it makes the selector switch start its selecting action which will be continued until it selects a free and efficient ARQ transmitting or TOR-channel. The information to investigate the efficiency of the channel is derived from the Efficiency Tester EO, one of which is connected to each TOR-channel. By means of the electronic switching method it is possible to complete the selecting and connecting process in a few milliseconds, provided that at least one ARQ channel is free and efficient.

Immediately after the selection is finished and a TEX-panel is connected to a TOR-channel, the programming circuit TPC makes that TOR-channel interrupt the idle time $\beta$ signal transmission on the forward way in order to transmit an address. By means of this address the remote TOR-channel receiver part knows which TEX-panel receiving part is to be connected to that TOR-channel in order to pass the information to the required TEX-panel.

The address may consist of a normal five unit telegraph code traffic symbol, the five information bits of which form the number of this address-responding TEX-panel in a binary code. For example, TEX-panel No. 1 transmits the address signal 00001 and TEX-panel No. 2 transmits the address signal 00010, etc. In order to avoid mis-routing due to transposed address signals, the address signal is transmitted three times in succession. The remote station receiver takes the address signal for correct when at least two out of the three signals are identical. One transposed signal among these three can be do no harm, and in ARQ systems the chance of obtaining two transposed signals in a group of three without a fault being detected is so small that by using this method, mis-routing practically will never occur.

After this connection has been set up by the receipt of two identical address signals, the connection is ready to pass traffic and/or pass a clearing signal. If after the two identical address signals are received, no traffic is ready to be transmitted, the idle time $\beta$ signals are then automatically sent, and after two of such idle time $\beta$ signals are received in succession at the receiving programming circuit RPC at the remote station, the selector at this remote station releases its connection and goes to its "free position" again. Therefore, in order to establish a connection, an additional two consecutive address signals must be transmitted and received again. These idle time $\beta$ signals are automatically transmitted when a traffic pause occurs and when the transmitting or calling TEX-panel is disconnected from a transmitter TOR-channel. However, no idle time $\beta$ signals are artificially inserted in the flow of traffic information from the TEX-panel or telex reader. Thus, the sequence of "idle $\beta$," "address," "idle $\beta$," address," "traffic," "idle $\beta$," "address," and "traffic" occurs according to the FLEX-system switching device of the present invention.

For security reasons, a TEX-panel to be connected to the first released TOR-channel will not be connected before at least four idle time $\beta$ signals have been transmitted. In this case two consecutive idle time $\beta$ signals are guaranteed to show up at the receiver end of the TOR-channel before any address is sent. The reason for not disconnecting the TEX-panel from the TOR-receiver before two consecutive idle time $\beta$ signals have been registered, is to safeguard the connection from being disconnected on a single idle time $\beta$ signal which could be a transposed information signal. Again the chance of two transpositions of two $\beta$ signals in succession is very rare.

In order to pass a clearing signal after an address signal, or at the end of traffic, seven signals of idle time $\alpha$ are transmitted. On receipt of these idle time $\alpha$ signals, the clearing criterion is communicated to the receiving TEX-panel, which in turn sends a clearing signal or start polarity to its associated switchboard and/or subscriber.

When the efficiency or quality of the ARQ transmitting route or TOR-channel drops below a predetermined value, the TEX-circuit, if any, working over this route is disconnected. This, however, will not take place before three signals of idle time $\beta$ have been transmitted. If these signals $\beta$ have been sent out, and there are no more traffic signals in the TOR-channel repetition storage, the switching over of the TEX-panel from one TOR-channel to another occurs without loss of characters. However, if during the predetermined period after the channel becomes inefficient, no $\beta$ signals can be transmitted due to constant cycling of the automatic error correction device in the TOR-channel, the TEX-panel will still be disconnected. In this case, once the re-routing of the TEX-panel has been performed, a loss of maximum three information characters could occur, and it is this loss which the present invention prevents.

When all of the TOR-channels are either inefficient or engaged, all the TEX-panels are blocked from accepting a call from the local switchboard. But since the TEX-panels are all simplex circuits, this completely busy or blocking indication is conveyed to any calling TEX-panel according to this FLEX system, only through the duplex TOR-channel system from the remote station. Also if one of the efficient and engaged TOR-channels becomes inefficient, its associated TEX-panel should pass a clearing signal (seven $\alpha$ signals) to notify the remote TEX-panel to disconnect the circuit and release its charges, because now no more traffic can be sent to it. Under these two specific circumstances, one of the TOR-channels that still is passing traffic from another TEX-panel is temporarily disconnected from the same and assigned to the TEX-panel that has to be given a busy signal or to send the clearing signal or seven idle time $\alpha$ signals. This TEX-panel can now send these clearing signals over this temporarily interrupted TOR-channel to its associated and/or formerly connected and remote TEX-panel in order to clear the remote subscriber from the circuit and release its charges and send the necessary disconnect or release signal back to the calling TEX-panel. After this clearing signal has been transmitted, the associated TEX-panels at each station are disconnected from the interrupted TOR-channel, and this TOR-channel is reconnected to the original TEX-panel user and its message is continued.

In the case that all of the TOR-channels have become inefficient, all the TEX-panels are forced to send clearing signals to their local switch boards after a predetermined guard time of, say, thirty seconds. This guard time is so long that one is sure that the remote station has also disconnected its TEX-panels, so that they also are cleared from the circuit.

Thus in summary, using the Flex System of applicants' copending patent application Ser. No. 489,318 filed Sept. 22, 1965, the switching over of the user of an ARQ or TOR-channel that has become inefficient or of poor quality to another ARQ or TOR-channel may cause the loss of information. This switching over occurs when the efficiency tester finds the utility of the ARQ or TOR-channel has fallen below the limit of reasonable using capacity. This can happen under two circumstances:

(A) The propagation becomes worse whereby the number of repetitions increase, but there still remain periods suitable for communication, and (B) The communication is abruptly and continuously interrupted for more than about thirty seconds due to propagation condition or equipment failure.

In case A, the limit of the inefficiency will be crossed slowly, after which the ARQ or TOR-channel accepts no further information and does no longer supply tape feed impulses to the information source, but in the periods of possible communication, the idle time signals $\beta$ are transmitted. When the channel has accepted three such idle time $\beta$ signals, all the information characters of the repetition storage are transmitted and accepted at the far end. This means that all traffic information that has been offered to the ARQ or TOR-channel has reached its destination. Now the information source can be switched off from the inefficient ARQ channel and it can hunt for another ARQ channel that is efficient. In this case A the switching over is effected without loss of information.

In the case B, the ARQ channel will not be able to transmit the information out of the repetition storage since further communication is not possible. This is because the channel remains cycling in repetition all the time, and after a predetermined time such as about thirty seconds, the information source will be disconnected automatically, because the subscriber must not be tied up to a circuit that is not useable.

When the information source is disconnected, it can select another channel that is efficient. Then the transmission can be continued over the newly selected channel. However, the three information characters left behind in the repetition storage of the deserted ARQ or TOR-channel, would be lost if it were not for the present invention. In case the reception of the signals in the information sending station was bad, it is impossible for this sending station to investigate whether the stored characters have been received at the far end receiving station or not. In case the break-down in communication was caused at the far end receiving station, the information sending station could conclude which signals have been received and which signals have not been received at the far end. However, to be able to conclude this, a dummy repetition storage device must be available in the information sending station. This dummy storage device has to contain the same information and in the same sequence as the real repetition storage.

(B) IMPROVEMENT TO PREVENT LOSS OF SIGNALS (FIGS. 3–7)

By using the system cycle from the ARQ or TOR-channel circuits, the defective operation of case B above can be avoided. No loss or duplication will occur if the repetition cycles at both ends of the channel finish in the correct phase, the correct phase being determined by the initiating position or phase of the repetition cycles. Accordingly, when a disconnect or an error causing a repetition occurs, the phase relationship between the repetition cycle and the system cycle is detected and registered at both the sending and receiving stations. Then, after being switched over to another efficient and available ARQ or TOR-channel, the information source communicates this phase relationship between system and repetition cycles to the newly connected channel, and likewise the addressee communicates this phase relationship back to the channel that addressed it. Then the repetition cycles at the transmitter and receiver can be started artificially in this phase, so that at the termination of the repetition period, in the newly selected channel or path, a situation is created as if the repetition period in the disconnected channel had been terminated and no signals lost. Thus no loss or duplication of signals will occur, provided the three signals stored in the dummy storage device are transmitted in the correct way, or are injected into the repetition storage of the newly selected ARQ channel in the correct sequence.

This however is not possible in the existing ARQ or TOR-channel apparatus, and it is not necessarily a requirement to force a repetition period, if only the effect of a repetition period can be performed. This implies that (1) At the transmitting end, the transmission of the signals from the dummy storage device be in the correct phase relationship with the system cycle, and that (2) At the receiving end, means are provided for preventing those signals from being printed or processed which show up during the character cycles of the system cycle, which would have been received in a printer blocking period of a regular repetition cycle.

Thus, in order to effect the error free change-over to other channels, the ARQ or TOR-channel must supply the following criteria:

(a) The beginning of a repetition cycle at the transmitting and at the receiving ends, and (b) The position in which the system cycle finds itself at the transmitting as well as at the receiving end.

(B)(1) Apparatus (FIG. 3)

(a) At sending part

The devices to realize the functions mentioned in the points (a) and (b) above are as follows: The switching parts of the transmitting part or section in (FIG. 3) are extended to include a dummy storage device Hz, a two-bit counting phase register Fz, a two-bit register counter Tz controlling a switch Sz, and a comparator circuit Cz connected to the phase register Fz.

This dummy storage device Hz is an eighteen bits register, i.e. 3 times (5 message bits plus 1 idle time bit), in which the characters fed to the ARQ or TOR-channel by the user or TEX-panel are stored in a convolutional way, so that the storage device Hz holds the same characters as are stored in the ARQ repetition storage device in the TOR-channel, that is for storing the three characters last transmitted.

The two-bits phase register Fz which has four possible states, picks up the position of the sending systerms' four character cycle at the beginning of each repetition cycle. Thus this phase register Fz registers or conserves the information of the system cycle/repetition cycle relationship or phase, when the disconnection from the ARQ or TOR-channel occurs, and it is not reset until another repetition cycle occurs.

The two-bits modulo four register counter Tz has the positions 0–1–2–3. When a regular disconnection takes place, which is any disconnection except the enforced or abrupt and prolonged one as mentioned under case B above, this counter Tz finds itself in its position 0. Thus this counter Tz only operates when an enforced or abrupt and prolonged disconnection occurs.

When the disconnection is an enforced one, due to abrupt circuit or equipment failure, so that less than the required three idle time $\beta$ signals can be transmitted and message information or part of the message information remains in the repetition storage, this counter Tz is brought into its position 1. Then, after the three address signals have been transmitted over a newly connected ARQ or TOR-channel, the transmission continues next by sending the last three stored and/or information signals out of the dummy storage device Hz under the control of this counter Tz, which then counts on up through position 3 and back to 0 on a character by character basis. Then when this counter Tz has come back into its position 0, (its normal position), the regular program or message is continued or processed out of the information source or TEX-panel.

In FIG. 3, the switch Sz is controlled by the counter Tz in position 0 to connect the TEX-panel to the connecting circuit CCA, and in its positions 1, 2 and 3 to connect the TEX-panel to the dummy storage device Hz.

When the register counter Tz finds itself in its position 1, idle time $\beta$ signals are transmitted up until the position of the character in the system cycle being transmitted in the newly connected ARQ or TOR-channel is two steps ahead of the same character position registered in phase register Fz (see also the table and diagram in FIGS. 4 and 7, respectively). This is determined in the comparator circuit Cz (see FIG. 3) connected to this phase register Fz, which compares the position of this phase register Fz with the position of the system cycle of the newly connected TOR-channel via conductor SC. Thus when the starting position of the system cycle of the new TOR-channel is two steps ahead of the registered position in the phase register Fz, the connecting and disconnecting circuit AAC is actuated so that the idle time $\beta$ signal transmission changes into the transmission of the first address signal for the remote TEX-panel. Now the address is in phase with the held position of the system cycle found in phase register Fz.

The left half of the table in FIG. 4 shows the four possible cases of different phase relationships between repetition cycle and system cycle at any disconnecting time or reception of any error requesting signal "RQ," and the corresponding registering and releasing positions of the phase register Fz. The right half of the table in FIG. 4 shows the corresponding seizing position for the start of the three address signals, i.e. two character cycles before the release position of the phase register Fz, so that the end of the third address signal will start the transmission of the information signals from the dummy storage device Hz in the proper position.

The transmission of the first address signal is followed by the sending of the second and third address signals, after which the transmission of the information characters from the dummy storage device Hz starts, i.e. immediately after three address signals are transmitted in the proper phase set by phase register Fz, the three stored signals in the dummy storage device Hz are transmitted also in the proper phase.

(B)(1)(b) At receiving part

The switching parts of the receiving section or part of the information processor of each TEX-panel also must be extended by a two-bit phase register F*o*, a one-bit register trigger A*o* for controlling a switch S*o*, and a second comparator C*o* connected to the phase register F*o*.

The two-bits phase register F*o* is similar to the phase register Fz and registers the position of the receiving system cycle at the beginning of each repetition cycle, i.e. when nothing is received; thus conserving the information of the system cycle/repetition cycle relationship at the receiving station.

The one-bit register or trigger A*o* is either in its position 0 or 1. This register trigger A*o* moves into its position 1 when the user or TEX-panel is connected to a continuously repeating ARQ or TOR-channel, and this user is selected by means of an address signal from another ARQ or TOR-channel to indicate that the previous TOR-channel has been disconnected. The register trigger A*o* is controlled into its 0 position, when the newly connected TOR-channel is not in repetition or cycling and the position of the receiving system cycle of the newly connected channel coincides in phase with the position registered by the phase register F*o*, i.e. in phase with the cut-off or start of prior repetition cycle.

The comparator C*o* connected to this phase register F*o* compares the position of the received system cycle via conductor SC′ with the position of this register F*o*, and when there is no repetition and they are in phase, it causes the one-bit register trigger A*o* to move into its position 0.

When the register trigger A*o* is in its position 1, it blocks the outgoing printer signal to the TEX-panel by applying stop polarity or ground to it via switch S*o* until the system cycles are in phase, and then this register A*o* goes to its position 0 to forward the printing signal to the TEX-panel from the connecting circuit CCB.

(B)(2) Operation

The schematic time diagrams of FIGS. 5 and 6 show the disconnection of an ARQ or TOR-channel under abrupt communication ending conditions. FIG. 5 represents the disconnection of a sending user at the master or sending station X of a circuit, say channel No. 1; and FIG. 6 represents the disconnection of a receiving user at the same end or station X of another circuit, say channel No. 2.

Now both users, channel No. 1 user and channel No. 2 user, select, each at one end of the circuit terminals, another circuit, say channel No. 3 and FIG. 7 shows the simultaneous reconnection of the channel No. 1 and No. 2 users to the newly selected channel No. 3, that is, both to the same channel which is in simplex operation in each direction. This is the most complicated situation that can occur.

(B)(2)(a) Enforced releases (FIGS. 5 and 6)

FIGS. 5 and 6 also show the information contents of the registers and counters Fz, Tz, Hz, F*o*, and A*o*, both before and after the enforced disconnection at the request for repetition signal "RQ," as well as the indication of the system cycle positions 0–1–2–3 which are in continuous rotation.

As stated previously, the dummy storage device Hz always contains the three last transmitted characters, and that phase registers Fz and F*o* register the positions of the transmitting and receiving system cycle, respectively, at the beginning of the last repetition cycle before the disconnection (see the three left side columns in FIG. 5 and the three right side columns in FIG. 6).

In the example shown in FIG. 5, the interruption of reception at the message sending station X starts during the transmission of the character C from that station, while the system-cycle at that station is in position 1. The repetition cycle that is thus started at station X due to the faulty reception, then starts when the system cycle is in its next position 2, at which time the transmission of the "RQ" signal (the first signal or start of each repetition cycle) takes place. Thus, this position 2 is registered in phase register Fz. At this time the dummy storage device Hz holds the characters "A," "B," and "C," which are the message signals or characters which have been transmitted last in this sequence. It is not, however, until the actual moment of disconnection or enforced release of the TOR-channel, that the counter register Tz is controlled from its normal position 0 to its position 1.

At the other end or station Y of the circuit transmission in the example shown in FIG. 6, the repetition cycle starts (see signal "RQ") at the received channel system cycle position 0, while the characters in the dummy storage Hz are "b," "c," "d," which are the three last transmitted characters from station Y in that channel in that sequence. Similarly, the register counter Tz is not controlled to its position 1 until the enforced release or disconnection occurs.

The position of phase register F*o* in the station Y in FIG. 5 registers the system cycle position 3, which is when the repetition cycle starts due to the reception of the request for repetition signal "RQ." The register trigger A*o*, however, remains in its position 0 until the user is called by the newly connected channel. Similarly, the phase register F*o* in the station X in FIG. 6, registers the position 2 of the system cycle, when the repetition cycle starts due to the faulty reception. Also its associated trigger A*o* remains in its 0 position like trigger A*o* of FIG. 5, until a new channel has been connected.

(B)(2)(b) Reconnections (FIG. 7)

After having selected a new channel in accordance with the multichannel switching system of applicants' copending application Ser. No. 489,318, filed Sept. 22, 1965, the left hand side of FIG. 7 schematically shows how the disconnected user from FIG. 5 waits until the newly connected channel finds its transmitting system cycle in a position 0 (as registered by phase register Fz+Modulo 2=position 0), so that the three address signals can be transmitted before the dummy storage device is started to be emptied of its three information or message characters or signals. At this moment, the first address signal "Ad 1" is released followed by the second "Ad 2" and third "Ad 3" address signals. This transmission of these address signals is immediately followed by the transmission of the characters stored in the dummy storage device Hz, which device has stored the message signals or characters "A," "B," "C." During the transmission of the characters "A," "B," "C," the register counter Tz passes through its positions 2 and 3, and ends up in position 0 during the character "C" transmission. With the counter Tz now in position 0, the transmission from the information source or TEX-panel may now take place, restart, or continue.

In the first column in the right hand half of FIG. 7, the reception of received signals are indicated, and as soon as the third address signal "Ad 3" is received and processed, the trigger A*o* is controlled to position 1 because the system cycle phase of first received address signal "Ad 1" (namely 0) was not the same as that stored in the phase register F*o* (namely 3). In time relation, this happens when the first character "A" from dummy storage device Hz in station X has been received. With the trigger A*o* in position 1, all characters received are prevented from being processed or printed, and trigger A*o* remains in this position 1 until the receiving system cycle of the newly connected ARQ or TOR-channel is in accordance with the registered position of the previous channel system cycle stored in the phase register F*o*. In this case it is position 3. This means that the characters "A," "B," and "C" from dummy storage device H*z* are not processed since trigger A*o* is in position 1, which means that these three characters have already been received correctly and printed, and should not be duplicated (see upper right half of FIG. 5). After having received the fresh character "D," the system cycle turns to position 3, coinciding with the registered position by phase register F*o*, and now the blocking of the processor is released and the character "D" will be processed or printed.

A similar process takes place for the connection of the user that was disconnected in FIG. 6, whose reconnection is also shown in FIG. 7. The address is transmitted from station Y when the system cycle is in position 2 (see upper right of FIG. 7) when the phase register Fz is in position 0+ Modulo 2 or in position 2, after which the three stored characters "b," "c," "d," from the corresponding dummy storage device H*z* are transmitted, as the counter Tz passes its positions 2 and 3 to end up in its position 0. Now fresh characters can be transmitted from the associated information source or TEX-panel, namely herein, the character "e."

The trigger A*o* in station X (left hand in FIG. 7) goes to position 1 when it detects the processing of the third address signal "Ad 3," but in this station × the receiving system cycle is in position 2 when the first character from dummy storage has been received, and, since the phase register F*o* also indicates position 2, the trigger A*o* is immediately returned to 0. Thus, no blocking of the processor takes place, and the character "b," and following characters "c," "d" are processed or printed. This is because when returning to the upper left hand side of FIG. 6 showing the ARQ receiving channel signals, the blocking period was started immediately after the character "a" had been received and processed, and thus all three of the following characters "b," "c" and "d" from dummy storage device H*z* were not received, and therefore have to be printed.

While there is described above the principles of this invention in connection with specific apparatus, it is to be clearly understood that this description is made only by way of example and not as a limitation to the scope of this invention.

What is claimed is:

1. In a multi-channel telecommunication system for multi-element code signals between at least two stations (X) and (Y), a system for automatically switching from one channel to another when said one channel is disconnected, the signals in each of said channels being transmitted and received in synchronous system cycle groups, each of said channels having an automatic error correcting device (ARQ) including a first storage means for a predetermined number of signals, in which device the correction occurs during a repetition cycle group of signals, a transmitting part and a receiving part at each station, and a plurality of connecting circuits (TEX panels) at each station for subscribers to said channels, each connecting circuit having a transmitting part and a receiving part, said automatic switching system comprising:

(A) a transmitting program circuit (TPC) connected to each transmitting part of each said connecting circuit, (B) separate first selecting swtch means (ST) connected to and controlled by each said transmitting programming circuit for connecting each transmitting programming circuit at one station with any one of said transmitting parts at all of said channels at said other stations, (C) a separate second storage means (H*z*) at the transmitting terminal for each connecting circuit for recording the same characters stored in said first storage means in said error correcting device, (D) a plural-bit phase register (F*z*) at the transmitting terminal for each connecting circuit for recording the position of the transmitting system cycle of that connected channel corresponding to the initiation of the last repetition cycle before the disconnection occurred over said channel.

(E) a plural-bit counter (Tz) at the transmitting terminal for each connecting circuit for counting out a whole cycle after a reconnection has been made to empty said second storage means, (F) a receiving program circuit (RPC) connected to each receiving part of each said channel, (G) separate second selecting switch means (SR) connected to and controlled by each said receiving programming circuit for connecting each said receiving programming circuit at one station with any one of said receiving parts of all said connecting circuits at said one station, (H) separate testing means (EO) connected between said receiving part of each channel and said one station and said first selecting means at all of said transmitting programming circuits, whereby those channels which are disconnected can be determined by each transmitting programming circuit before selection of a channel is made, (I) a second plural-bit phase register (F*o*) at each receiving terminal for each connecting circuit for recording the position of the transmitting system cycle of the connected channel corresponding to the disconnection of that channel which is the initiation of the last repetition cycle, and (J) a one-bit register (A*o*) having two positions and located at the receiving terminal for each connecting circuit for indicating a forced disconnection and blocking its associated connecting circuit in one of its positions, and for deblocking said associated connecting circuit in its other position.

2. A system according to claim 1 including means to transmit the address of the desired connecting circuit to be called when said new channel has been selected, before the signals in said storage means are transmitted, and to transmit said address at the proper system cycle phase.

3. A system according to claim 1 wherein said plural-bit registers include comparators for comparing the phase of the system cycle of the newly selected channel with the registered position in the plural-bit phase registers, which comparators are operated when the newly selected channel is connected.

4. A system according to claim 1 wherein said one-bit register includes means for preventing the printing of said new selected channel signals when said new selected channel is in repetition, and when the system cycle is not in phase with the position registered by said second plural-bit phase register.

References Cited

UNITED STATES PATENTS

| | | | |
|---|---|---|---|
| 2,805,278 | 9/1957 | Van Duuren ---- | 340—146.1 X |
| 3,001,018 | 9/1961 | Van Dalen ------ | 340—146.1 X |
| 3,108,253 | 10/1963 | Blodgett et al. ------ | 340—146.1 |
| 3,156,767 | 11/1964 | Van Duuren et al. | 340—146.1 X |

EUGENE G. BOTZ, Primary Examiner

C. E. ATKINSON, Assistant Examiner

U.S. Cl. X.R.

325—41; 343—176